United States Patent
Dice et al.

(10) Patent No.: US 8,103,838 B2
(45) Date of Patent: Jan. 24, 2012

(54) SYSTEM AND METHOD FOR TRANSACTIONAL LOCKING USING READER-LISTS

(75) Inventors: David Dice, Foxboro, MA (US); Nir N. Shavit, Cambridge, MA (US)

(73) Assignee: Oracle America, Inc., Redwood City, CA (US)

( * ) Notice: Subject to any disclaimer, the term of this patent is extended or adjusted under 35 U.S.C. 154(b) by 577 days.

(21) Appl. No.: 12/350,792

(22) Filed: Jan. 8, 2009

(65) Prior Publication Data

US 2010/0174875 A1 Jul. 8, 2010

(51) Int. Cl.
*G06F 12/16* (2006.01)
(52) U.S. Cl. .................... 711/152; 711/150; 711/163
(58) Field of Classification Search .................. None
See application file for complete search history.

(56) References Cited

U.S. PATENT DOCUMENTS

| | | | |
|---|---|---|---|
| 6,799,236 | B1 | 9/2004 | Dice et al. |
| 2007/0136289 | A1 | 6/2007 | Adl-Tabatabai et al. |
| 2007/0143755 | A1 | 6/2007 | Sahu et al. |
| 2007/0198519 | A1 | 8/2007 | Dice et al. |

OTHER PUBLICATIONS

Dice, et al., "Understanding Tradeoffs in Software Transactional Memory," IEEE, 2007, pp. 21-33.
Dice, et al., "What Really Makes Transactions Faster?," Proc. of the 1st TRANSACT 2006 workshop, 2006.
Dice, et al., "Transactional Locking II," Proc. of the 20th International Symposium on Distributed Computing (DISC 2006).
F. Ellen, Y. Lev, V. Luchangco, and M. Moir, "SNZI: Scalable Non-Zero Indicators," PODC 2007.
Spear, et al., "Privatization Techniques for Software Transactional MemoryPrivatization Techniques for Software Transactional Memory," University of Rochester Dept. of Computer Science Technical Report #915. Feb. 2007.
Volkmar Uhlig, "The mechanics of in-kernel synchronization for a scalable microkernel," ACM SIGOPS Operating Systems Review archive, vol. 41 , Issue 4 (Jul. 2007) table of contents.
"Interface ReadWriteLock," Copyright 2004 Sun Microsystems, Inc., http://java.sun.com/j2se/1.5.0/docs/api/java/util/concurrent/locks/ReadWriteLock.html.
"Class ReentrantReadWriteLock," Copyright 2004 Sun Microsystems, Inc., http://java.sun.com/j2se/1.5.0/docs/api/java/util/concurrent/locks/ReentrantReadWriteLock.html.
Garthwaite, Dice, White, "Supporting per-processor local-allocation buffers using lightweight user-level preemption notification," Copyright 2005 Sun Microsystems, Inc., VEE'05, Jun. 1112, 2005, Chicago, Illinois, USA.
Dice, Garthwaite, "Mostly Lock-Free Malloc," ISMM 2002.

*Primary Examiner* — Hetul Patel
(74) *Attorney, Agent, or Firm* — Robert C. Kowert; Meyertons, Hood, Kivlin, Kowert & Goetzel, P.C.

(57) ABSTRACT

In traditional transactional locking systems, such as Transactional Locking with Read-Write locks (TLRW), threads may frequently update lock metadata, causing system performance degradation. A system and method for implementing transactional locking using reader-lists (TLRL) may associate a respective reader-list with each stripe of data in a shared memory system. Before reading a given stripe as part of a transaction, a thread may add itself to the stripe's reader-list, if the thread is not already on the reader-list. A thread may leave itself on a reader-list after finishing the transaction. Before a thread modifies a stripe, the modifying thread may acquire a write-lock for the stripe. The writer thread may indicate to each reader thread on the stripe's reader-list that if the reader thread is executing a transaction, the reader thread should abort. The indication may include setting an invalidation flag for the reader. The writer thread may clear the reader-list of a stripe it modified.

18 Claims, 4 Drawing Sheets

SYSTEM AND METHOD FOR TRANSACTIONAL LOCKING USING READER-LISTS

BACKGROUND OF THE INVENTION

1. Field of the Invention

This invention relates generally to transactional memory computer systems and, more specifically, to a system and method for implementing transactional locking using reader-lists.

2. Description of the Related Art

Shared-memory computer systems allow multiple threads of execution to access and operate on the same memory locations. In such systems, it is often important that a thread execute a series of instructions as a single atomic block. Such an atomic block may be known as a critical section. Any other thread that observes memory values resulting from a partial execution of a critical section may behave incorrectly.

Critical sections are traditionally protected by locks. That is, before a thread may execute a critical section, it must first acquire and hold one or more locks associated with the critical section. While it holds the lock, no other thread may execute a critical section protected by that lock. This mechanism may be known as mutual exclusion. The pitfalls of mutual exclusion mechanisms are numerous and well known. They include dead-lock, race conditions, priority inversions, software complexity, and performance limitations.

Transactional memory is a mechanism that allows a thread to execute a critical section as a speculative transaction, that is, either completely and atomically or not at all. The instructions comprising a transaction may be executed and then either "committed", allowing the aggregate effect to be seen by all other threads, or "aborted", allowing no effect to be seen. Transactional attempts that commit may be said to have "succeeded", while those that abort may be said to have "failed". If a transaction aborts, the thread may retry executing the transaction. Transactional memory may be implemented in hardware, software, or a combination thereof.

Transactional Locking (TL) is a software-based, transactional memory technique that may allow multiple threads to execute critical sections concurrently, as transactions. If a data conflict occurs, one or more of the transactions involved may abort execution of the critical section. For example, a data conflict may occur when one thread attempts to commit a transaction that read a value from memory if that value has been modified by another thread since being read.

SUMMARY

Transactional Locking techniques are software-based, transactional memory techniques that may allow multiple threads to execute critical sections concurrently, as transactions. In order to detect data conflicts, currently available implementations of TL, such as Transactional Locking with Read-Write locks (TLRW), may associate data in a logically sequential portion of memory, which may be referred to as a stripe, with one or more locks. While TLRW affords numerous benefits, the performance of such a system may be hindered by excessive lock traffic. For example, TLRW associates each data stripe with a lock. The lock may contain a counter to indicate the number of threads that have read the associated stripe transactionally, but that have not yet committed the transaction. Under TLRW, in order to read the stripe transactionally, a reader must increment the counter of the associated lock. Furthermore, when committing the transaction, a reader must decrement the same counter.

In order to avoid the performance penalties associated with traditional software transactional locking schemes such as TLRW, in various embodiments, transactional locking may be implemented using reader-lists (TLRL) rather than using reader-counters or other locking mechanisms that require updating for every transactional read. In some embodiments, each stripe in a transactional locking system may be associated with a unique, per-stripe reader-list, which may identify one or more threads that have read the associated stripe transactionally. A reader-list may be implemented as any combination of variables and/or data structures that configured to identify one or more readers. In various embodiments, a reader-list may identify a reader through a reader identifier, which may be assigned by an application, operating system, or other transactional memory mechanism and/or implementation. In some embodiments, a reader identifier may be based on the identity of the processor executing the reading thread.

According to various embodiments, in order to read a stripe transactionally, a thread may first ensure that it is on (i.e., identified by) the reader-list associated with the stripe. If the thread is not on the reader-list, it may add itself to the reader-list before reading the stripe. However, in various embodiments, a reader that has added itself to a reader-list may not be required to remove itself from that list upon finishing the transaction. By leaving itself on a reader-list after completing a transaction, a reader may avoid executing one or more store and/or compare-and-swap (CAS) type instructions for removing itself from the reader-list. Additionally, by leaving itself on a reader-list, in various embodiments, a reader may avoid executing at least one store and/or CAS type instruction for adding itself to the same reader-list when subsequent transactions require it to read the same stripe.

In some embodiments, in order to modify a stripe, a writing thread may first acquire a write-lock associated with the stripe. In some embodiments, before modifying a stripe, a writing thread may notify all threads on the stripe's reader-list that the writer has acquired the write-lock. In various embodiments, this notification may include setting an invalidation flag associated with each reader thread. If a reader thread is executing a transaction when it receives such a notification, it may respond by aborting the transaction. In some embodiments, a reader thread may check the status of its invalidation flag before committing a transaction. If the flag is set, then the thread may abort its transaction. Otherwise, the thread may commit its transaction. In some embodiments, in addition to notifying all threads on the reader-list, a writer thread may also clear the reader-list (i.e., make it empty).

Thus, a unique property of TLRL, according to some embodiments, is that readers may avoid removing themselves from one or more per-stripe reader-lists. Instead, readers may add themselves, but removal may be deferred until subsequent writes to those stripes. In some embodiments, writers may invalidate readers, for example, by setting one or more invalidation flags, or other invalidation indicators, associated with those readers. In some embodiments, an invalidation indication may include one or more signals, such as UNIX-style asynchronous software signals, sent to an invalidated reader. Thus, transactional conflicts may be detected via reader-lists and invalidations, rather than via version numbers or reader-counters, such as those used in other transactional locking implementations.

Many variations and optimizations are possible. For example, in embodiments in which the transactional memory employs deferred stores, a writer thread may acquire multiple write-locks at the end of a transaction. In such embodiments, the writer may avoid sending redundant invalidations to one or more reader threads by constructing a set of reader threads to be invalidated that is the union of the reader-lists of the stripes associated with the multiple write-locks. In various embodiments, a writer may omit itself from the set of reader threads. In other embodiments, a writer thread may simply avoid invalidating itself.

In some embodiments, false invalidations may be possible, wherein a thread is invalidated because it remains on a reader-list even though it has already committed the corresponding transaction. In other embodiments, false invalidations may be avoided. For example, a reader thread may track the stripes it has read inside of each transaction (i.e., each transaction's read set) and a writer thread may invalidate the reader only if the stripe the writer will modify is in the reader's read set. In some such embodiments, a reader may use space and/or time efficient data structures, such as commutative content hashes (e.g., Bloom filters) to track its read-set.

In various embodiments, reader-lists may be implemented as bitmaps or as any other data structure or combination of data structures that may be configured to identify one or more threads. In different embodiments, various optimizations may be applied to reader-list implementations. For example, in order to avoid duplicate entries, in some embodiments, a reader-list may be implemented as a set. In some embodiments, the reader-list may be immutable.

In various embodiments, reader-list management may be simplified and/or optimized by minimizing the number of possible reader identifiers in circulation at any given time. For instance, in some embodiments, a thread may assume the identifier of the processor executing it rather than assuming a thread-specific identifier.

In various embodiments, TLRL implementations may provide implicit privatization (IP). For example, IP may be provided by TLRL implementations wherein a writer thread avoids invalidating a reader while the reader is committing a transaction.

In various embodiments, a transactional locking system may adaptively switch between execution using TLRL and execution using other transactional locking protocols. For example, according to one embodiment, a system may switch between TLRL, TLRW, and/or TL2 based on an observed invalidation rate or false invalidation rate and/or other observed performance characteristics.

Figure 1:
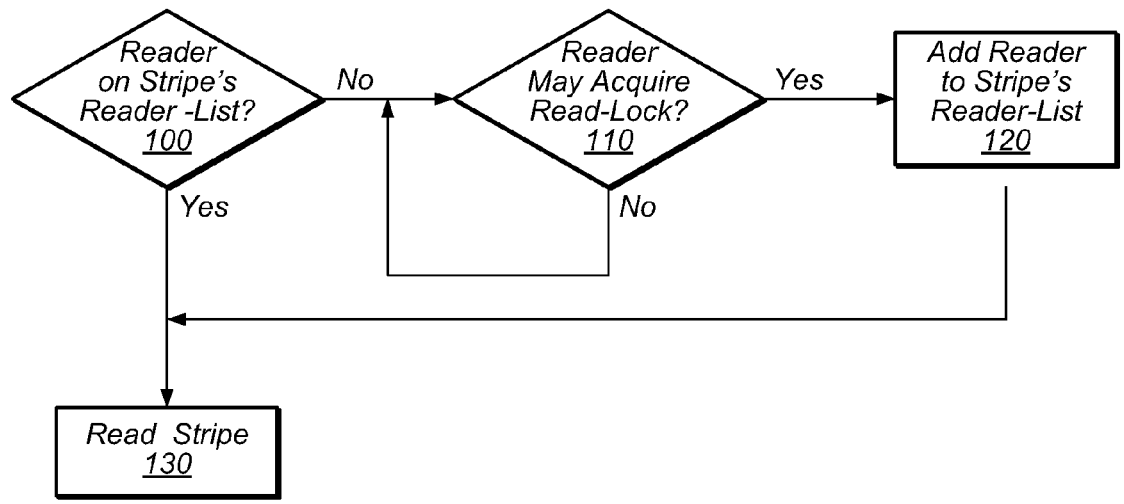
FIG. 1 is a flow diagram illustrating a method for a reading a stripe using TLRL, according to various embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF THE EMBODIMENTS

Transactional Locking techniques, such as TLRW, are software based, transactional memory techniques that may allow multiple threads to execute critical sections protected by the same lock concurrently, as transactions. While TLRW affords numerous benefits, the performance of a system employing TLRW may be hindered by excessive lock traffic. For example, in TLRW implementations, a read-write lock may be used to control access to a stripe. When executing in transactional mode, a thread must acquire any read-write locks associated with a stripe before reading that stripe. Before reading a stripe that is protected by a given read-write lock, a thread must increment a counter field in the lock that reflects the number of threads that have read the stripe transactionally but that have not yet committed. Such threads may be referred to as readers, and the value of the counter field may be referred to as the reader count. When a thread commits a transaction, the thread must decrement the reader count to signal that it is no longer reading the stripe as part of an open transaction. Threads that wish to modify the value in a stripe (i.e., writers) must wait for the reader count associated with the stripe equal to zero, indicating that no readers are outstanding.

Thus, under TLRW, each time a thread reads a stripe as part of a transaction, the thread may perform at least two store operations: one to increment the associated reader count prior to reading the stripe and another to decrement the reader count at the end of the transaction. Such frequent updates to lock metadata may cause numerous performance problems, which may be associated with store overhead, atomic store overhead, cache coherence traffic, serialization of hotspots, or other overheads. For example, counter update operations may often be implemented as atomic compare-and-swap (CAS) operations, which may incur a local latency penalty, thereby degrading system performance even further than would traditional store operations. In another example, to increment and decrement a reader count associated with a stripe, a thread may be required to write to shared memory. Such writes to communal data may cause cache coherence messages to be broadcast on one or more system buses, further degrading system performance. Furthermore, a CAS operation to update a lock may sometimes fail due to one or more other threads attempting to update its reader count at the same time. In such cases, a thread may attempt to update a reader count multiple times, causing further system performance degradation. Consequently, in circumstances in which many threads tend to read one or more popular stripes (e.g., a tree root), TLRW may be inefficient, particularly on classic symmetric multi-processing (SMP) systems where write-sharing tends to be expensive relative to write-sharing on chip multi-processing CMP systems. As a result of having to update reader counts, transactions that utilize popular shared stripes may pay a considerable performance cost due to cache coherence traffic as the cache line containing the lock "sloshes" between processors.

In order to avoid the performance penalties associated with traditional software transactional locking schemes such as TLRW, in various embodiments, transactional locking may be configured to use reader-lists (TLRL) rather than to use reader counters or other locking mechanisms that require updating for every transactional read. In some embodiments, each stripe in a transactional locking system may be associated with a unique, per-stripe reader-list, which may identify one or more threads that have read the associated stripe transactionally. A reader-list may be implemented as any combination of variables and/or data structures that may be configured to identify one or more readers. In various embodiments, a reader-list may identify a reader through a reader identifier, which may be assigned by an application, operating system, or other transactional memory mechanism and/or implementation. In some embodiments, a reader identifier may be based on the identity of the processor executing the reading thread.

According to various embodiments, a reader may only read a given stripe if the reader is on the reader-list associated with that stripe. In some embodiments, a reader may remain on a reader-list, even after committing the corresponding transaction. In some embodiments, clearing of the reader-list may be performed subsequently by a writer thread as part of acquiring a write-lock on the stripe.

According to various embodiments, in order to read a given stripe transactionally, a reader must ensure that it is on (i.e., identified by) the reader-list associated with that stripe. FIG. 1 illustrates a method for a thread to read a stripe, according to various embodiments. In this example, before transactionally reading a stripe, a reader thread may determine if it is already on the stripe's reader-list, as in 100. If so, as indicated by the affirmative exit from 100, then the reader already holds the lock and may therefore read the stripe, as in 130. However, if the reader is not on the stripe's reader-list, as indicated by the negative exit from 100, then the reader may determine whether it can acquire a read-lock on the stripe. This determination, shown in FIG. 1 as 110, may include determining whether a writer is currently holding a write-lock on the stripe, or if other conditions exist which may preclude the reader acquiring a read-lock. If a reader may not acquire a read-lock for a given stripe (e.g., a write-lock for the stripe is currently being held), then the reader may wait for satisfactory conditions to arise (e.g., the write-lock being released) and may try again, as in the feedback loop from the negative exit of 110. If the wait is sufficiently long, a reader may be configured to abort the transaction (not shown). Once the reader is permitted to acquire the read-lock, as shown by the affirmative exit from 110, it may add itself to the stripe's reader-list, as in 120, and read the stripe, as in 130.

When a reader adds itself to a reader-list, as in 120, the new state of the reader-list may be used to identify the reader. In addition, the new state of the reader-list may also be used to identify any reader identifiable by the old state of the reader-list (i.e., prior to the modification). For example, if two threads add themselves to a reader-list in succession, then the identity of both threads may be determined based on the resulting state of the reader-list. In various embodiments, a reader may add itself to a reader-list by reading the old reader-list, creating a new reader-list that includes all identifiers on the old reader-list plus the reader's identifier, and installing the new reader-list using a CAS operation. In such embodiments, the CAS operation may be used to ensure that no other thread has modified the reader-list during the modification operation.

As noted earlier, in order to add itself to a reader-list, a reader may execute one or more CAS and/or store type instructions. However, in various embodiments, a reader that has added itself to a reader-list may not be required to remove itself from that list upon finishing the transaction. By leaving itself on a reader-list after completing a transaction, a reader may avoid executing one or more store and/or CAS type instructions for removing itself from the reader-list. Additionally, by leaving itself on a reader-list, in various embodiments, a reader may avoid executing at least one store and/or CAS type instruction for adding itself to the same reader-list when subsequent transactions require it to read the same stripe. Memory access patterns in computer programs often exhibit temporal locality, that is, memory addresses accessed recently are likely to be accessed again soon, either by the same transaction or across multiple transactions. Reader threads may therefore be likely to read stripes two or more times within a relatively short period of time. According to various embodiments, system performance may consequently benefit from the use of TLRL due to the reduced number of CAS and/or other store type operations associated with uninstalling and reinstalling readers out of and into reader-lists. Reader-lists of popular stripes, such as root nodes of tree-type data structures, may populate quickly. Under TLRL, according to various embodiments, the locks of such data structures may be updated less frequently than under currently available TL schemes, such as TLRW. Therefore, systems utilizing TLRL may gain performance benefits not found in these earlier TL schemes.

In some embodiments, a TLRL implementation may make use of deferred stores (i.e. redo logging). For example, transactional stores may be saved in a per-thread speculative store buffer until commit time, at which time the underlying write-locks (write permissions) may be acquired and the store operations copied from the speculative store buffer to their respective shared memory locations. This copying from the speculative store buffer to shared memory may be referred to as a write-back. In other embodiments, a TLRL implementation may use undo logging, for example, by performing writes in place and maintaining an undo log that may be used to restore old values to memory in the event of an abort.

In order to execute each write according to various embodiments, a writer must acquire the stripe's write-lock. The manner in which a writer may acquire a write-lock may depend on how the locks are implemented. For example, if a lock contains a write-lock bit, then the writer may set that bit to a value denoting that the lock is held. In some embodiments, a writer may defer acquiring write-locks until the end of the transaction (e.g., using redo logs and/or deferred stores), while in other embodiments, a writer may acquire each write-lock as it encounters the corresponding write operation in the transaction (e.g., using undo logs and/or in-place stores).

Figure 2:
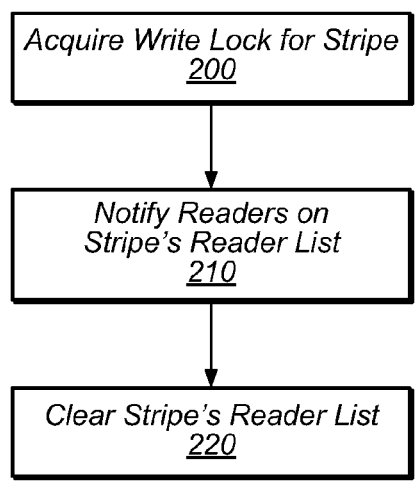
FIG. 2 is a flow diagram illustrating a method for acquiring a write-lock using TLRL, according to various embodiments.

According to various embodiments, a writer thread may remove threads from a reader-list. One example of a method for a writer thread to remove threads from a reader-list is illustrated in FIG. 2. In this example, in order to execute a write operation on a given stripe, a writer must acquire the stripe's write-lock, as in 200. According to some embodiments, when acquiring a write-lock on a given stripe, a writer may notify all threads on the stripe's reader-list that the write-lock is being acquired, as in 210. For example, in some embodiments, this may include setting an "invalidate" flag for each reader in the list. In other embodiments, the notification may be implemented using another type of indicator, such as a UNIX-style software signal that the writer may send to each thread on the stripe's reader-list. According some embodiments, a reader that has been invalidated while executing a transaction (i.e., one whose invalidate flag has been set to a given value that indicates invalidation) must abort its transaction. For example, in some embodiments, a reader may check its invalidate flag before committing a transaction. If the invalidate flag is set to true, the reader may abort its transaction. Otherwise, the reader may commit its transaction. In some embodiments, a writer may notify only those threads that are currently executing a transaction, rather than all threads on the reader-list.

In some embodiments, a writer may clear the reader-list when it acquires a write-lock, as in 230. Clearing the reader-list may include modifying the state of the reader-list so that it identifies no readers. In other embodiments, a writer may leave data in the reader-list, but set a flag associated with the reader-list to indicate that the reader-list should be regarded as empty. In such embodiments, a writer may clear a reader-list just before releasing the write-lock.

As illustrated in FIG. 2, writers under TLRL may preempt readers by invalidating the readers' transactions. This is in contrast to earlier TL implementations, such as TLRW, in which a writer must wait until all readers have completed before acquiring a write-lock. In some embodiments, a reader-list may include potential readers in addition to current and/or past readers. Since a reader-list may accumulate membership over time until it is cleared by a writer, it may not necessarily be the case that a reader on a stripe's reader-list is currently executing a transaction that has read that stripe.

Figure 3:
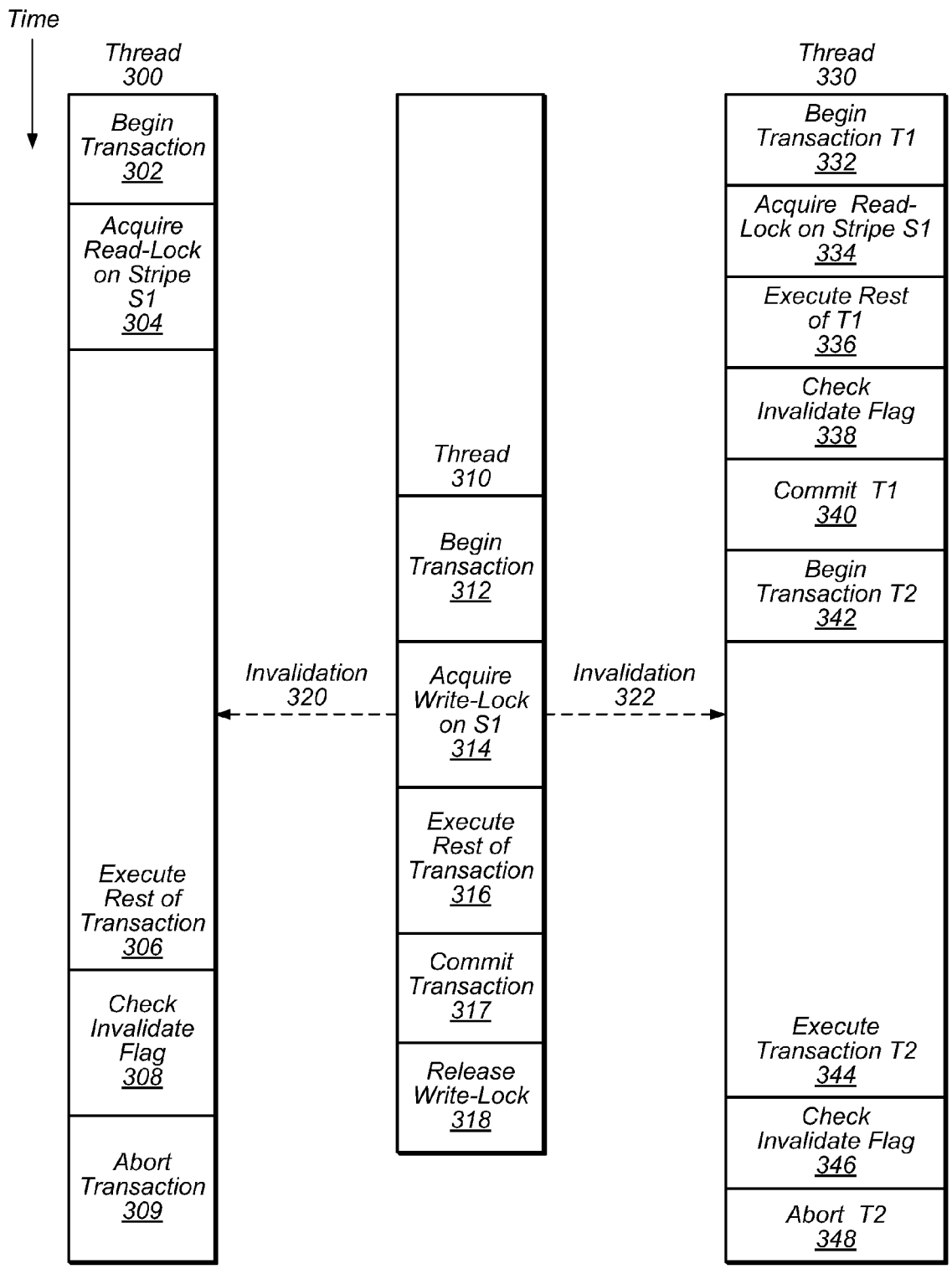
FIG. 3 illustrates an example of three threads executing using TLRL, according to one embodiment.

FIG. 3 illustrates an example of the execution of three threads, using TLRL, according to one embodiment. In the illustrated example, thread 300 begins executing a transaction, as in 302. As part of that transaction, thread 300 may need to read stripe S1, which may necessitate the acquisition of a read-lock on that stripe, as in 304. When acquiring the read-lock, thread 300 may add itself to stripe S1's reader-list. Thread 300 may then continues to execute the remainder of the transaction, as in 306.

In this example, while thread 300 executes the remainder of the transaction, as in 306, thread 310 begins a transaction, as in 312. As part of its transaction, thread 310 may need to modify the same stripe S1, on which thread 300 acquired a read-lock in 304. In order to modify stripe S1, thread 310 may acquire a write-lock on S1, as in 314. When acquiring the write-lock, as in 314, thread 310 may send an invalidate indication (e.g., 320, 322) to any thread in S1's reader-list. In the illustrated example, because thread 300 placed itself on S1's reader-list in 304, thread 310 sends invalidate indication 320 to thread 300 as part of acquiring a write-lock on S1 in 314. Thread 310 may also send invalidate indications (e.g., 322) to other threads on stripe S1's reader-list and then clear the reader-list before proceeding to execute the rest of the transaction (as in 316), committing the transaction (as in 317), and eventually releasing the write-lock (as in 318). In the illustrated embodiment, thread 310 may acquire the write-lock in place, as shown. In alternate embodiments, thread 310 may use deferred stores by acquiring locks (e.g., 314) after executing the transaction body, as in 316, but just before committing the transaction, as in 317. In such embodiments, thread 310 may execute the rest of its transaction (as in 316) prior to executing lock acquisition (as in 314).

In some embodiments, the receipt of invalidate indication 320 may set an invalidation flag associated with thread 300 and/or its currently executing transaction. In various embodiments, an invalidate flag may be implemented as one or more bits in hardware and/or software. In such embodiments, when thread 300 finishes executing its transaction, as in 306, it may check its associated invalidate flag, as in 308. Since the invalidate flag was set by invalidate indication 320, thread 300 may abort its transaction, as in 309. If an invalidation flag is used as the invalidation indication, thread 300 may clear the invalidate flag after aborting its transaction. In other embodiments, a thread may clear an invalidate flag before beginning a new transaction. In some embodiments, in addition to aborting (as in 309), thread 300 may perform and/or invoke contention management mechanisms and eventually retry execution, such contention management mechanisms may in various embodiments include a backoff scheme and/or other concurrency throttling mechanisms. In some embodiments, an aborted thread may reattempt execution of the critical section using mutual exclusion rather than transactional locking.

In some embodiments, TLRL may permit false invalidations. For example, a writer may set an invalidation flag of a reader because that reader appears in a reader-list, even though the reader may have already committed the relevant transaction. The interaction between threads 310 and 330 in FIG. 3 illustrates such an situation. In this example, thread 330 begins a transaction T1 (as in 332), acquires a read-lock on stripe S1 (as in 334), executes the rest of T1 (as in 336), and checks its invalidation flag (as in 338). In this example, having determined that the invalidation flag does not indicate that the transaction has been invalidated, thread 300 successfully commits T1 (as in 340), and begins a new transaction T2 (as in 342).

In this example, transaction T2 does not access stripe S1. However, due to having acquired a read-lock on S1 at 334, thread 330 appears on S1's reader-list. Recall that, in some embodiments, readers may leave themselves on reader-lists of stripes, even after committing the transactions that depended on those stripes. Therefore, during execution of transaction T2 in 344, S1's reader-list may still identify thread 330 as a reader and when thread 310 acquires a write-lock in 314, it may send an invalidate indication 322 to thread 330. In the example illustrated in FIG. 3, thread 310 invalidates thread 330 during the execution of T2, for example, by setting the invalidate flag of thread 330. Therefore, when thread 330 finishes executing transaction T2 (as in 344), it may find its invalidate flag set to true (e.g., in 346), and may consequently abort T2 (as in 348). Such an abort may be referred to as a false invalidation since stripe S1 was not read by transaction T2. Ideally, transaction T2 would not have been invalidated.

In order to avoid false invalidations, in various embodiments a reader may track the set of stripes it has accessed as part of an uncommitted transaction. This set may be known as a read set. In some embodiments, a writer such as thread 310 may avoid false invalidations by examining the read sets of threads on the reader-list before invalidating them. In one such embodiment, a writer attempting to acquire a write-lock on a given stripe may invalidate a reader only if the given stripe is in the reader's read set. In some embodiments, a reader may summarize its read set using a space-efficient and/or time-efficient filter, such as a Bloom filter. In such embodiments, a writer may check the Bloom filter of each reader in a reader-list to determine if the reader should be invalidated. In various embodiments, read set tracking approaches such as these may improve system performance by reducing the rate of false invalidations.

As discussed earlier, in various embodiments, a writer may acquire multiple write-locks as part of one transaction. The writer may defer obtaining those locks until commit time. In some embodiments, before committing a transaction, a writer may iterate over every write-lock it has acquired during executing of the transaction and invalidate every reader in the corresponding reader-lists. However, in some instances, this approach may result in redundant invalidations. For example, if a reader appears in the reader-lists of two stripes for which a writer holds write-locks, then the writer may invalidate the reader twice. In alternate embodiments, a writer may avoid redundant invalidations by constructing a set of unique readers to invalidate. A writer may construct such a set by calculating the union of all readers on reader-lists that the writer intends to invalidate and invalidating only the members of that set. In some embodiments, a writer may remove itself from such a set if it is a member.

Figure 4:
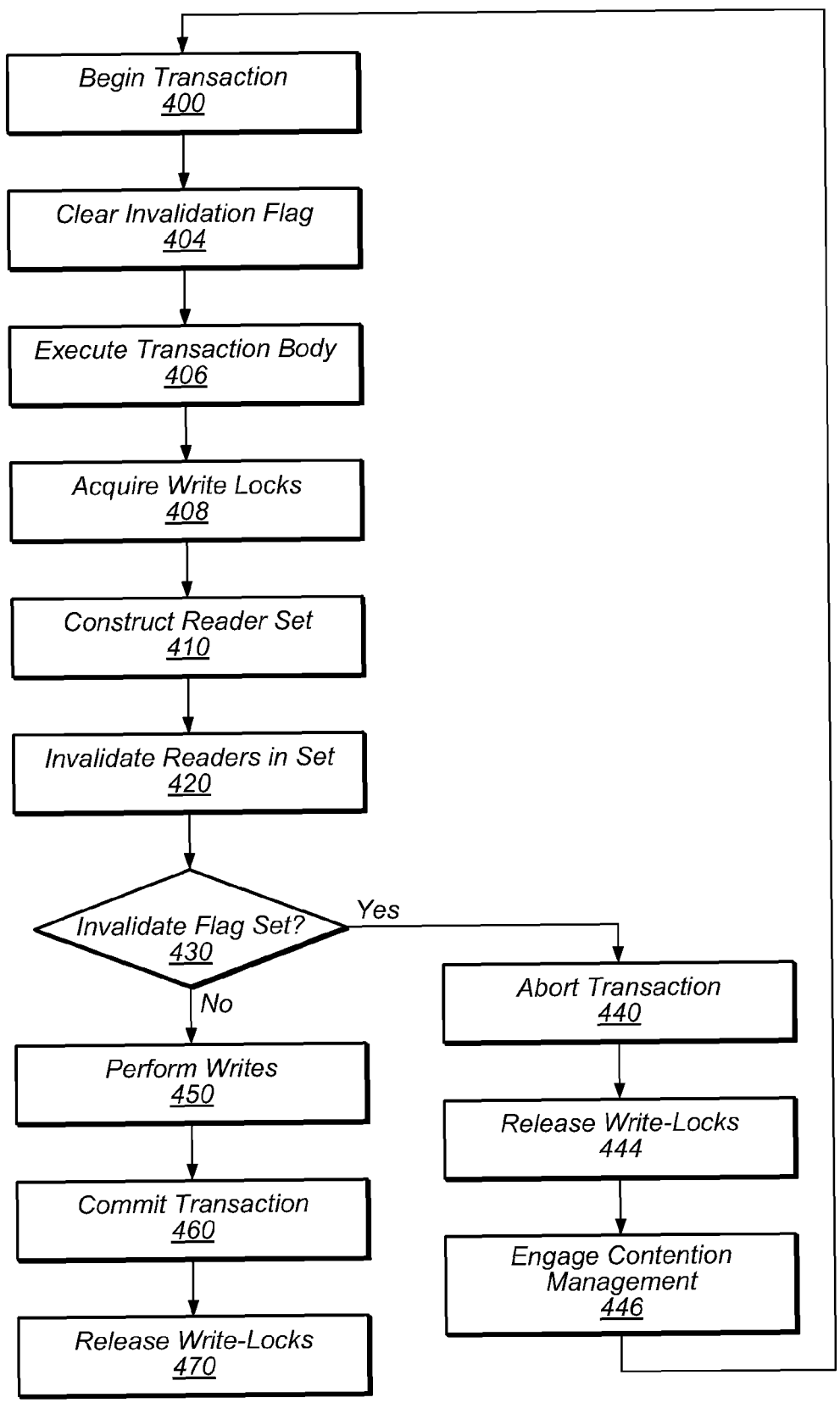
FIG. 4 is a flow diagram illustrating a method for executing a transaction using TLRL, according to one embodiment.

FIG. 4 illustrates an example of a method for executing a transaction in a system employing TLRL, according to one embodiment. In this example, a thread may begin executing a transaction, as in 400. In the illustrated example, the thread may begin each transaction by clearing its own invalidate flag (e.g., setting the flag to false), as in 404. This may be done before any stripes are read as part of the transaction and may avoid aborts due to residual invalidation values.

According to the illustrated example, the thread may execute the transaction body, as in 406, and defer store operations using a speculative store buffer. At the end of the transaction, the thread may need to execute the stores in its speculative store buffer. In order to execute these stores, the thread may acquire write-locks for every stripe it has modified speculatively, as in 408. In some embodiments, a thread may analyze the reader-lists associated with the locks acquired in 408 in order to construct a set of unique readers, as in 410. As shown in 420, the thread may then invalidate the readers in the reader set constructed in 410. As discussed above, in some embodiments, the thread may invalidate readers by setting an invalidation flag for each reader. In some embodiments, the thread may leave itself out of the reader set constructed in 410 or may otherwise avoid self-invalidating in 420.

Once a thread has invalidated readers in the reader set, as in 420, it may check its own invalidation flag, as in 430. If the transaction has been invalidated, as indicated by the affirmative exit from 430, the thread may abort its transaction, as in 440. A thread may then release its write-locks, as in 444, and invoke one or more contention management functions, as in 446. In various embodiments, contention management functions invoked in 446 may include concurrency-throttling mechanisms, such as a backoff scheme, k-exclusion, and/or other schemes. After engaging in contention management, as in 446, a thread may re-attempt the transaction, shown in FIG. 4 as the return to 400. In some instances, a thread may re-attempt the critical section using mutual exclusion rather than a transaction. In some embodiments, a decision to re-attempt the transaction using mutual exclusion may be made by the contention management mechanisms invoked in 446.

If, on the other hand, the thread finds that its invalidation flag is not set, as indicated by the negative exit from 430, the thread may perform the writes in its speculative store buffer, as in 450. The thread may then commit its transaction, as in 460, and release its write-locks, as in 470.

In some embodiments, a lock may be implemented as a series of bits, wherein one specified bit is understood to be the write-lock bit. In alternate embodiments, a write-lock may comprise multiple bits of a write-lock word, rather than a single write-lock bit. In still other embodiments, a lock may be implemented as one or more atomically addressable bytes. In some embodiments, when the write-lock bit or word is set to a value indicating that the write-lock is held, then the remaining bits in the lock may be ignored. In other embodiments, the remaining bits in the lock may identify the writer. In some embodiments, when the write-lock bit is set to a value indicating that the write-lock is not held, then the remaining bits in the lock may be interpreted as a bitmap, wherein each bit corresponds to a respective reader and indicates whether the respective reader is in the reader-list. For example, if a bit is equal to a given value (e.g., 1) then the reader is in the reader-list. Otherwise, it is not. In embodiments in which a reader-list is implemented as a bitmap, updating the list may comprise combining the old list with the new reader's identifier using an OR operation and/or atomically installing the new reader-list using a CAS operation. In some embodiments, using a CAS operation may provide verification that the reader-list was not taken and/or modified during the operation.

In some embodiments, a reader-list may be implemented as a list data structure of reader identifiers or a pointer to such a list rather than as a bitmap. Note that a list of identifiers may be arbitrarily long, in various embodiments. In order to avoid duplicate entries, in some embodiments, a reader-list may be implemented as a set. In some embodiments, the reader-list may be immutable (e.g., designated by the "final" keyword in Java™). An immutable data structure may have the desirable property that a pointer to a list of identifiers always represents the same list of reader identifiers. Since pointers to reader-lists may be operated on using CAS instructions, as discussed above, immutable reader-lists may help avoid ABA type synchronization issues.

In some embodiments, a TLRL implementation may provide a function for adding a reader to a reader-list (e.g., readerListAdd( )). In such embodiments, the readerListAdd( ) function may accept as arguments a reader-list L and an identifier I, and may return a pointer to a new list that contains the elements of L plus I, if I is not already in the list. If I is already in L, then the function may return a new list with deep equality to L. In such embodiments, a thread may easily test for its own membership in a list by testing if readerListAdd(L, self) is equal to L.

In some embodiments, a readerListAdd( ) function may be used to construct a new list on-demand, which may be time-consuming in some implementations. In some embodiments, it may be possible to conserve and/or reuse reader identifiers. For example, in one embodiment, a reader R in a reader-list L1 may be associated with a reader-list L2, which indicates the union of L1 and R. In such embodiments, when reader R invokes readerListAdd(L1, R), the function may search for R in L1. If the instance of R in L1 is found, then the function may construct a new list L2 and associate L2 with R in L1. On future invocations of readerListAdd(L1, R), the function may return the already constructed L2, pointed to by R in L1. Such embodiments may be time-efficient because they may perform fewer list constructions than a naïve implementation. In such embodiments, concurrency concerns may be obviated by the immutable reader-lists described above.

In some embodiments, the length of reader-lists may be bound to a maximum number of identifiers. Restricting the length of reader-lists may help to reduce the total space requirement of a TLRL system and/or to constrain the number of readers that can potentially be invalidated by an individual write operation, thus constraining invalidation costs. In some embodiments, if a reader attempts to add itself to a reader-list, one or more readers already on the list may be evicted. In various embodiments, different eviction policies may be used to determine which reader is to be evicted from a reader-list when the reader-list is full. Such eviction policies may include least-recently used, least-frequently used, first-in-first-out, and/or random eviction policies. In some embodiments, a reader may be invalidated as a result of having been evicted from a reader-list.

In some embodiments, reader-lists may be encoded via commutative content hashes, such as Bloom filters. Bloom filters may allow dense and compact representations of various collections of readers but may admit false positive membership tests, which may reduce performance through unnecessary invalidations and consequent transactional aborts.

In various embodiments, reader-list management may be simplified and/or optimized by minimizing the number of possible reader identifiers in circulation at any given time. For instance, in some embodiments, a thread may assume the identifier of the processor executing it rather than assuming a thread-specific identifier. In such embodiments, the number of identifiers may be bound to the number of processors, which is typically smaller than the number of threads in a computer system at any given time. Additionally, the number of processors may be known in advance and may not fluctuate during runtime, further simplifying TLRL implementations. In some embodiments, a processor may use a preemption callback to notify a thread coming onto the processor that the thread had previously been preempted. In such embodiments, the preempted thread may respond by aborting any uncommitted transactions and/or assuming the identifier of the current processor as its own. When the thread subsequently attempts to acquire a read-lock, it my use the identifier it acquired from the current processor.

In various embodiments, a TLRL system may reduce the number of reader identifiers in circulation by combining groups of readers into clusters. In such embodiments, each entry in a reader-list may identify a cluster of readers rather than a single reader. Therefore, when a writer clears a reader-list, it may invalidate every reader in each cluster identified by the reader-list. This may cause false invalidations in some instances, since a member of a cluster may be invalidated even though it has not read the associated stripe as part of an open transaction. In various embodiments, a cluster map encoding may be used to assign cluster identifiers to readers and thus reduce the number of identifiers in circulation.

In some embodiments that support deferred stores, a thread may attempt to satisfy a transactional load operation by searching a speculative store buffer for the desired value. If the required data exists in the speculative load buffer, then the load operation may be configured to load the data value most recently written to the speculative store buffer for the data address specified by the load operation. This may be a value written earlier in the same transaction. If the address does not appear in the speculative store buffer, then the reader may be configured to read the stripe containing that address.

The "privatization problem" is a known problem in implementing software transactional memory systems. In various embodiments, TLRL may be configured to provide implicit privatization (IP). In one example, to provide IP, it may be sufficient to stall a thread T1 from returning from its commit operation while one or more active transactions, which have read stripes subsequently modified by T1, have not yet committed. Under TLRL, as described herein, this set of active transactions may be the set of threads that T1 invalidates. Therefore, to provide IP in some embodiments, T1 may execute its commit operation normally, but may delay returning from the commit operation until the set of invalidated threads finishes executing. For example, after having completed the write-back and dropped the write-locks, a thread may waits for all concurrently active and conflicting readers to finish (either abort or commit) before returning from its commit phase.

In another example, IP may be provided by TLRL implementations wherein a writer thread avoids invalidating a reader while the reader is committing a transaction. In such embodiments, a writer thread may delay invalidating one or more reader threads until the reader threads finish the commit phase. In other words, TLRL may provide IP by not allowing a thread to be invalidated during a commit operation. In such embodiments, writers may invalidate a conflicting reader if such a reader is executing in the speculative phase of its transactional attempt, but may not do so while a thread is executing in the commit phase of its transactional attempt. In some embodiments, this mechanism may be implemented by configuring each thread's invalidation flag to indicate that the thread is in one of four states at any given time: NEUTRAL, TRANSACTIONAL, INVALIDATED, or COMMITTING. For example, a thread T1 may modify its invalidation flag to indicate that T1 is in the NEUTRAL state if T1 is not executing a transaction, in the TRANSACTIONAL state if T1 is executing a transaction body, or in the COMMITTING state if T1 is in the process of committing a transaction. A thread T2 may attempt to invalidate T1 by modifying the invalidation flag of T1 to indicate that T1 is in the INVALIDATED state rather than the TRANSACTIONAL state. In this case, T1 may detect that it has been invalidated and abort its transaction. However, if T1's invalidation flag indicates that T1 is in the COMMITTING state, then T2 may either wait for T1 to complete its commit operation, by waiting for T1's flag to indicate that T1 has exited the COMMITTING state, or T2 may abort itself. Thus, in such embodiments, while a thread commits, it may effectively deny writes to its read set. Using the mechanisms described above, IP may be provided according to various embodiments.

In various embodiments, a transactional locking system may adaptively switch between execution using TLRL and execution using other transactional locking protocols. For example, according to one embodiment, a system may switch between TLRL, TLRW, and/or TL2 based on an observed invalidation rate or false invalidation rate and/or other observed performance characteristics.

Figure 5:
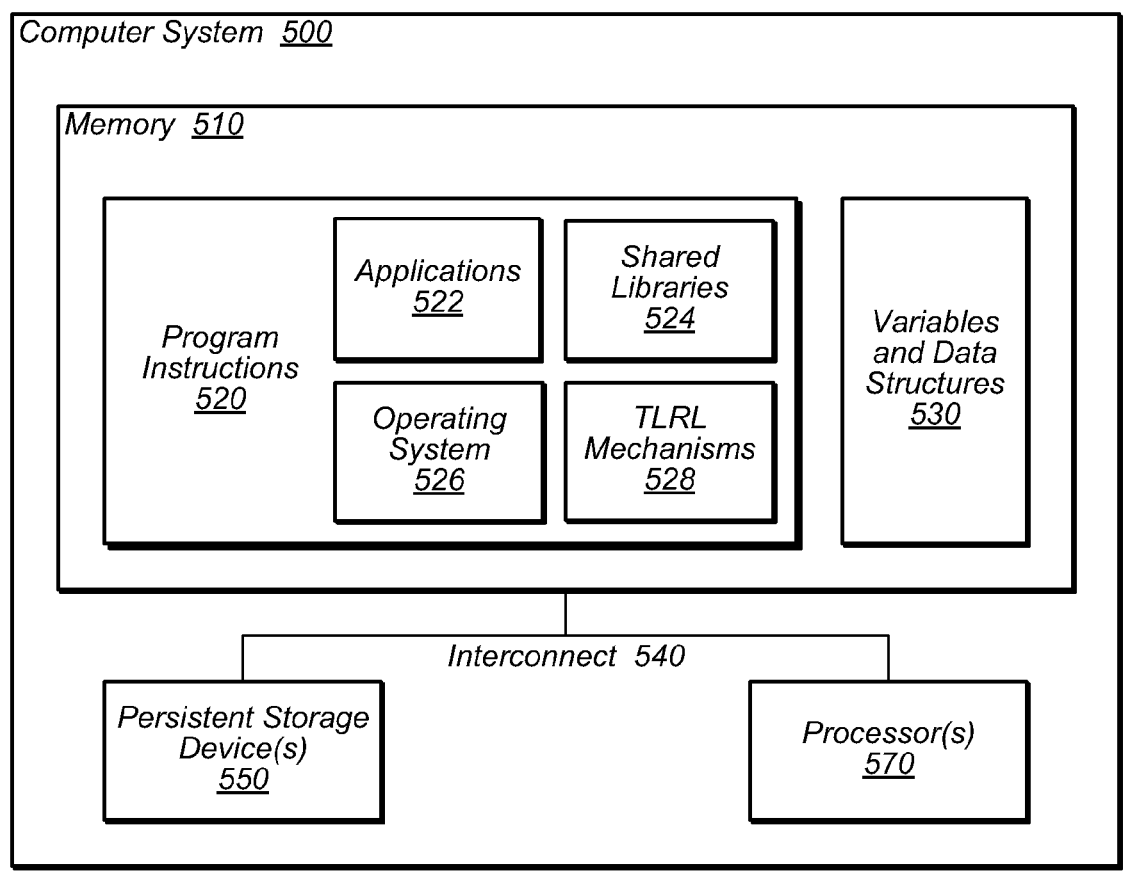
FIG. 5 is a block diagram illustrating a computer system configured to implement TLRL, according to various embodiments.

FIG. 5 illustrates a computing system configured to implement the methods described herein, according to various embodiments. The computer system 500 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The TLRL mechanisms described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 500 may include one or more processors 570, each of which may include multiple cores, any of which may be single or multi-threaded. The computer system 500 may also include one or more persistent storage devices 550 (e.g. optical storage, magnetic storage, hard drive, tape drive, solid state memory, etc) and one or more memories 510 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 5 (e.g., video cards, audio cards, additional network interfaces, peripheral devices, a network interface such as an ATM interface, an Ethernet interface, a Frame Relay interface, etc.)

The one or more processors 570, the storage device(s) 550, and the system memory 510 may be coupled to the system interconnect 540. One or more of the system memories 510 may contain program instructions 520. Program instructions 520 may include program instructions executable to implement one or more applications 522, shared libraries 524, operating systems 526, and/or TLRL mechanisms 528, as described herein. Program instructions 520 may be encoded in platform native binary, any interpreted language such as Java™ byte-code, or in any other language such as C/C++, Java™, etc or in any combination thereof.

The program instructions 520 may include software components and/or mechanisms configured to provide functions, operations and/or other processes for implementing TLRL, as described herein. For example, TLRL mechanisms 528 may include program instructions executable to abort and/or commit transactions, acquire and/or release locks, and modify reader-lists, such as by implementing a readerListAdd( ) function. Software components to support such functions may exist in one or more of the TLRL mechanisms 528, shared libraries 524, and/or operating systems 526. In some embodiments, applications 522 may provide one or more components for implementing TLRL, as described herein. For example, applications 522 may define custom contention management components for implementing contention management mechanisms, as in 446 of FIG. 4.

The system memory 510 may further comprise variables and data structures 530. Variables and data structures 530 may be used to store data used in TLRL, such as reader-lists, locks, and/or stripes, as described herein.

Although the embodiments above have been described in considerable detail, numerous variations and modifications will become apparent to those skilled in the art once the above disclosure is fully appreciated. For example, locks and/or reader-lists may be implemented using various encoding schemes not discussed in detail herein. It is intended that the following claims be interpreted to embrace all such variations and modifications.

What is claimed:

1. A computer-implemented method, comprising:
   a thread executing a transaction in a multi-threaded, transactional memory system, wherein said executing the transaction comprises:
      the thread determining whether it is eligible to read a stripe in memory based, at least in part, on a value in a reader-list associated with the stripe;
      the thread adding itself to the reader-list if the thread determines that it is not eligible to read a stripe; and
      the thread reading the stripe from memory.

2. The method of claim 1, further comprising, subsequent to said reading the stripe:
   a second thread acquiring a write-lock associated with the stripe;
   the second thread determining that the thread should be invalidated;
   the second thread providing an indication to the thread that the second thread has acquired a write-lock on the stripe; and
   the second thread modifying a value of the stripe;
   wherein said determining that the thread should be invalidated comprises determining that the thread is on the reader-list associated with the stripe.

3. The method of claim 2, further comprising:
   in response to the thread receiving the indication, the thread aborting the transaction.

4. The method of claim 2, further comprising:
   the second thread removing the thread from the reader-list.

5. The method of claim 2, wherein said determining that the thread should be invalidated further comprises:
   determining that the thread has read the stripe in a transaction and that the thread has not committed the transaction in which the stripe was read.

6. The method of claim 1, further comprising, subsequent to said reading the stripe:
   a second thread acquiring a write-lock associated with the stripe;
   the second thread determining that the thread is on the reader-list associated with the stripe;
   the second thread determining that the thread is in a commit phase of a transactional execution;
   in response to said determining that the thread is in a commit phase, the second thread delaying until the thread exits the commit phase; and
   the second thread modifying a value of the stripe.

7. A non-transitory computer-readable storage medium storing program instructions executable by a processor in a multi-threaded, transactional memory system to implement:
   a thread executing a transaction, wherein said executing the transaction comprises:
      the thread determining whether it is on a reader-list associated with a stripe in memory;
      the thread adding itself to the reader-list if the thread determines that it is not on the reader-list; and
      the thread reading the stripe from memory.

8. The storage medium of claim 7, wherein the program instructions are further executable to implement, subsequent to said reading the stripe:
   a second thread acquiring a write-lock associated with the stripe;
   the second thread determining that the thread should be invalidated;
   the second thread providing an indication to the thread that the second thread has acquired a write-lock on the stripe; and
   the second thread modifying a value of the stripe;
   wherein said determining that the thread should be invalidated comprises determining that the thread is on the reader-list associated with the stripe.

9. The storage medium of claim 8, wherein the program instructions are further executable to implement:
   in response to the thread receiving the indication, the thread aborting the transaction.

10. The storage medium of claim 8, wherein the program instructions are further executable to implement:
    the second thread removing the thread from the reader-list.

11. The storage medium of claim 8, wherein said determining that the thread should be invalidated further comprises:
    determining that the thread has read the stripe in a transaction and that the thread has not committed the transaction in which the stripe was read.

12. The storage medium of claim 7, wherein the program instructions are further executable to implement, subsequent to said reading the stripe:
    a second thread acquiring a write-lock associated with the stripe;
    the second thread determining that the thread is on the reader-list associated with the stripe;
    the second thread determining that the thread is in a commit phase of a transactional execution;
    in response to said determining that the thread is in a commit phase, the second thread delaying until the thread exits the commit phase; and
    the second thread modifying a value of the stripe.

13. A system comprising:
one or more processors;
a memory coupled to the one or more processors and storing program instructions executable by the one or more processors to implement:
  a thread executing a transaction in a multi-threaded, transactional memory system, wherein said executing the transaction comprises:
    the thread determining whether it is on a reader-list associated with a stripe in memory;
    the thread adding itself to the reader-list if the thread determines that it is not on the reader-list; and
    the thread reading the stripe from memory.

14. The system of claim 13, wherein the program instructions are further executable to implement, subsequent to said reading the stripe:
  a second thread acquiring a write-lock associated with the stripe;
  the second thread determining that the thread should be invalidated;
  the second thread providing an indication to the thread that the second thread has acquired a write-lock on the stripe; and
  the second thread modifying a value of the stripe;
  wherein said determining that the thread should be invalidated comprises determining that the thread is on the reader-list associated with the stripe.

15. The system of claim 14, wherein the program instructions are further executable to implement:
  in response to the thread receiving the indication, the thread aborting the transaction.

16. The system of claim 14, wherein the program instructions are further executable to implement:
  the second thread removing the thread from the reader-list.

17. The system of claim 14, wherein said determining that the thread should be invalidated further comprises:
  determining that the thread has read the stripe in a transaction and that the thread has not committed the transaction in which the stripe was read.

18. The system of claim 13, wherein the program instructions are further executable to implement, subsequent to said reading the stripe:
  a second thread acquiring a write-lock associated with the stripe;
  the second thread determining that the thread is on the reader-list associated with the stripe;
  the second thread determining that the thread is in a commit phase of a transactional execution;
  in response to said determining that the thread is in a commit phase, the second thread delaying until the thread exits the commit phase; and
  the second thread modifying a value of the stripe.

* * * * *